(12) United States Patent
Sud

(10) Patent No.: US 10,972,316 B1
(45) Date of Patent: Apr. 6, 2021

(54) CHANNEL ESTIMATION USING A CHIRP SIGNAL AND THE FRACTIONAL FOURIER TRANSFORM

(71) Applicant: The Aerospace Corporation, El Segundo, CA (US)

(72) Inventor: Seema Sud, Reston, VA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/783,218

(22) Filed: Feb. 6, 2020

(51) Int. Cl.
| | |
|---|---|
| *H04B 17/336* | (2015.01) |
| *H04L 25/02* | (2006.01) |
| *H04L 25/03* | (2006.01) |
| *H04L 12/707* | (2013.01) |

(52) U.S. Cl.
CPC ....... *H04L 25/0248* (2013.01); *H04B 17/336* (2015.01); *H04L 25/03038* (2013.01); *H04L 45/24* (2013.01)

(58) Field of Classification Search
CPC ... H04L 27/2602; H04L 27/265; H04L 1/005; H04L 25/0204; H04L 25/03305; H04L 25/03038; H04B 1/69; H04B 2001/6912; H04B 17/336
USPC ................................. 375/130, 139–144, 227
See application file for complete search history.

(56) References Cited

U.S. PATENT DOCUMENTS

| | | | | |
|---|---|---|---|---|
| 7,110,432 | B2* | 9/2006 | Hooton | H04B 1/69 375/139 |
| 7,224,716 | B2* | 5/2007 | Roman | H04B 1/69 370/503 |
| 8,824,272 | B2 | 9/2014 | Sud | |
| 9,804,999 | B2 | 10/2017 | Sud | |
| 10,180,495 | B2 | 1/2019 | Sud | |
| 10,437,664 | B2 | 10/2019 | Sud | |
| 10,790,946 | B2* | 9/2020 | Melodia | H04L 1/0003 |
| 2008/0049555 | A1* | 2/2008 | Holm | G01S 15/74 367/99 |
| 2008/0165833 | A1* | 7/2008 | Lee | H04B 1/69 375/139 |
| 2010/0224762 | A1* | 9/2010 | Hauske | G01V 8/12 250/214 C |

(Continued)

OTHER PUBLICATIONS

Cagatay Candan et al., "The Discrete Fractional Fourier Transform," 1999 IEEE International Conference on Acoustics, Speech, and Signal Processing, Proceedings ICASSP99 (Cat. No. 99CH36258), Phoenix, AZ, pp. 1713-1716 (Mar. 15-19, 1999).

(Continued)

*Primary Examiner* — Emmanuel Bayard
(74) *Attorney, Agent, or Firm* — LeonardPatel PC

(57) ABSTRACT

Channel estimation using a chirp signal and the Fractional Fourier Transform (FrFT) is disclosed. A relatively short chirp may be transmitted, and its received components may be converted to tones using the FrFT, from which the channel tap magnitudes and delays can readily be computed. This may involve measuring peaks in the rotated spectrum, measuring the time between the peaks, and mapping the time in the rotated plane back to the original time. Such a technique has various advantages over conventional channel estimation techniques, such as providing high accuracy even in very poor multipath environments and requiring relatively few samples of a chirp, which hence can reduce pilot overhead.

22 Claims, 12 Drawing Sheets

(56) References Cited

U.S. PATENT DOCUMENTS

| | | | | |
|---|---|---|---|---|
| 2012/0093198 | A1* | 4/2012 | Dabak | H04B 3/54 |
| | | | | 375/139 |
| 2012/0313900 | A1* | 12/2012 | Dahl | G06F 3/043 |
| | | | | 345/177 |
| 2013/0181861 | A1* | 7/2013 | Zohar | G01S 11/02 |
| | | | | 342/118 |
| 2014/0192622 | A1* | 7/2014 | Rowe | G01S 5/28 |
| | | | | 367/117 |
| 2016/0091421 | A1* | 3/2016 | Sorensen | G01N 21/85 |
| | | | | 356/517 |
| 2016/0211916 | A1* | 7/2016 | Yang | H04B 10/07951 |
| 2017/0070377 | A1* | 3/2017 | Sawahashi | H04L 25/03305 |
| 2017/0094665 | A1* | 3/2017 | Sha | H04L 27/265 |
| 2017/0279571 | A1* | 9/2017 | Melodia | H04L 27/2602 |
| 2017/0367578 | A1* | 12/2017 | Melodia | A61B 5/0028 |
| 2019/0312610 | A1* | 10/2019 | Dongare | H04B 1/12 |
| 2019/0317191 | A1* | 10/2019 | Santra | G01S 7/295 |

OTHER PUBLICATIONS

Cagatay Candan et al., "The Discrete Fractional Fourier Transform," IEEE Transactions on Signal Processing, vol. 48, No. 5, pp. 1329-1337 (May 2000).

Eugene Golovins et al., "Impact of multipath channel parameters on channel estimation performance in OFDM systems," IEEE AFRICON 2009, Nairobi, Kenya (Sep. 23-25, 2009).

Seema Sud, "A Simple Method for Separating Weak and Strong Moving Targets in Clutter for a Radar System using the Fractional Fourier Transform," Signal processing: an International Journal (SPIJ), vol. 10, No. 3, pp. 31-40 (2016).

\* cited by examiner

CHANNEL ESTIMATION USING A CHIRP SIGNAL AND THE FRACTIONAL FOURIER TRANSFORM

FIELD

The present invention generally relates to communications, and more specifically, to channel estimation using a chirp signal and the Fractional Fourier Transform (FrFT).

BACKGROUND

The Fractional Fourier Transform (FrFT) has been applied in numerous fields of research, including optics, quantum mechanics, image processing, and communications. The FrFT is a powerful tool that can extract signals from noise or separate two signals that overlap in time and/or frequency. The application of the FrFT lends itself particularly to the problem of separating multiple overlapping radar chirp signals. Chirps become tones in the proper FrFT domain, and hence can be readily extracted or notched (i.e., removed).

A time-frequency plane representation 100 of a signal x(t) and noise n(t) is shown in FIG. 1. This is also called the Wigner Distribution (WD), which can be a useful visualization tool for the FrFT. The time and frequency axes are orthogonal to each other in this representation. The time axis may be rotated using a rotational parameter a, where $0 \leq a < 2$, to determine the new time axis $t_a$ and frequency axis $f_a$. This is done using an FrFT and provides a new way of looking at a signal. In this example, rotating to the new time axis $t_a$ makes the signal and noise more separable, enabling a filter to extract the signal and completely suppress the noise. Filtering in time or frequency alone would not have resulted in noise suppression that is as effective.

The FrFT of a function $f(x)$ of order a is defined as:

$$F^a[f(x)] = \int_{-\infty}^{\infty} B_a(x, x') f(x') dx' \quad (1)$$

where the kernel $B_a(x, x')$ is defined as:

$$B_a(x, x') = \frac{e^{i(\pi\hat{\phi}/4 - \phi/2)}}{|\sin(\phi)|^{1/2}} \times e^{i\pi(x^2 \cot(\phi) - 2xx' \csc(\phi) + x'^2 \cot(\phi))} \quad (2)$$

where $\phi = a\pi/2$ and $\hat{\phi} = \text{sgn}[\sin(\phi)]$. This applies to the range $0 < |\phi| < \pi$, or $0 < |a| < 2$. In discrete time, the N×1 FrFT of an N×1 vector x can be modeled as:

$$X_a = F_a x \quad (3)$$

where $F^a$ is an N×N matrix whose elements are given by:

$$F^a[m, n] = \sum_{k=0, k \neq (N-1+(N)_2)}^{N} u_k[m] e^{-j\frac{\pi}{2}ka} u_k[n] \quad (4)$$

and where $u_k[m]$ and $u_k[n]$ are the eigenvectors of the matrix S defined by:

$$S = \begin{bmatrix} C_0 & 1 & 0 & \cdots & 1 \\ 1 & C_1 & 1 & \cdots & 0 \\ 0 & 1 & C_2 & \cdots & 0 \\ \vdots & \vdots & \vdots & \ddots & \vdots \\ 1 & 0 & 0 & \cdots & C_{N-1} \end{bmatrix} \quad (5)$$

and $$C_n = 2\cos\left(\frac{2\pi}{N}n\right) - 4 \quad (6)$$

Here, a is the variable rotational parameter, where a=2 is the same as a=0, and is varied using a step size Δa. Typically, Δa is chosen to be 0.1 in a low noise (and clutter) environment, and to be 0.01 when the signal is weak or the noise is strong. However, even smaller step sizes for dense environments may be considered.

It is known that the projection of the WD of a signal x onto the time axis $t_a$ gives the energy of the signal, which is equivalent to taking the magnitude squared in the FrFT domain a. In other words, the quantity in Eq. (3) is computed, its magnitude squared is taken (i.e., $|X_a|^2$), and the energy in the rotated signal is obtained. This is shown by the gray curve in WD representation 200 of FIG. 2. This is analogous to taking the magnitude squared of a Fast Fourier Transform (FFT) to obtain the energy of a signal in the frequency domain. This quantity is conventionally called power spectral density (PSD), and a similar expression for PSD in the FrFT domain a is:

$$PSD_x(a) = |X_a|^2 \quad (7)$$

Note that $PSD_x(a)$ is readily computed from Eq. (3) via an FrFT, whereas determining the WD of the signal and finding its projection is much more difficult in practice. There are various techniques for efficiently computing the FrFT, such as that proposed by Candan. See C. Candan et al., "The Discrete Fractional Fourier Transform," Proc Int. Conf. on Acoustics, Speech, and Sig. Proc. (ICASSP), Phoenix, Ariz., pp. 1713-1716 (Mar. 15-19, 1999).

However, while the FrFT can be used to identify signals in dense environments, estimating a channel for a moving transmitter is still problematic. Signals tend to be scattered, reflected, or diffracted off of objects in the environment. This "multipath problem" 300 is illustrated in FIG. 3. In radio frequency (RF) communications, both terrestrial and satellite, the propagation channel causes errors. These errors are due to the multipath nature of signals in real environments. The line-of-sight (LOS) signal arrives first and reflected/scattered/diffracted signal components arrive at the receiver with different delays and amplitudes. This can cause destructive interference or even cancel out the direct LOS path signal.

In order to properly extract data from the signal, the multipath must be accounted for. The amplitudes and the delays of each component should be estimated to match the components up in time and add them together. This may be performed a priori if the transmitter is in a fixed location. However, if the objects in the environment are causing multipath change or if the transmitter is driving, flying, orbiting, or otherwise moving, periodic channel estimation usually needs to be performed to try to correct for the changing characteristics of the multipath signal on the fly.

Conventionally, most channel estimation techniques for a moving transmitter are performed by sending a signal with a relatively short known preamble and header to a cell tower via a mobile phone, for example, and intermittently sending the preamble data thereafter. This sequence of "training bits," known as a pilot, is used in concert with certain algorithms (e.g., rake receivers or equalizers) to correct for the channel. The first received signal component is typically the LOS signal.

However, this technique is unreliable. It is difficult to know which bit is which in the signal. For instance, it is difficult to know whether a received bit is the first bit in the preamble or another bit where overlapping signal components exist. Also, conventional channel estimation techniques are not very accurate, with channel estimation root mean square errors (RMSEs) of 0.07 to 0.3, which worsen as noise increases. These channel correction techniques are limited in accuracy by the estimates and are often computationally expensive. Accordingly, improved channel estimation and signal extraction techniques may be beneficial.

SUMMARY

Certain embodiments of the present invention may provide solutions to the problems and needs in the art that have not yet been fully identified, appreciated, or solved by current channel estimation technologies. For example, some embodiments of the present invention pertain to channel estimation using a chirp signal and the FrFT.

In an embodiment, a system includes a transmitting computing system and a receiving computing system. The transmitting computing system is configured to generate a chirp as a preamble for a signal and transmit the signal including the chirp preamble to the receiving computing system. The receiving computing system is configured to receive a plurality of multipath signal components from the transmitted signal, estimate coefficients of a channel of the transmitted signal using an FrFT and the chirp preamble, and correct for the channel using the estimated coefficients.

In another embodiment, a computer-implemented method includes generating a chirp as a preamble for a signal, by a computing system. The computer-implemented method also includes transmitting the signal including the chirp, by the computing system.

In yet another embodiment, a computer-implemented method includes receiving a plurality of multipath signal components resulting from a transmitted signal including a chirp preamble, by a computing system. The computer-implemented method also includes estimating a vector of coefficients of a channel of the transmitted signal, by the computing system, using an FrFT and the chirp preamble. The computer-implemented method further includes correcting for the channel using the estimated vector of coefficients.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
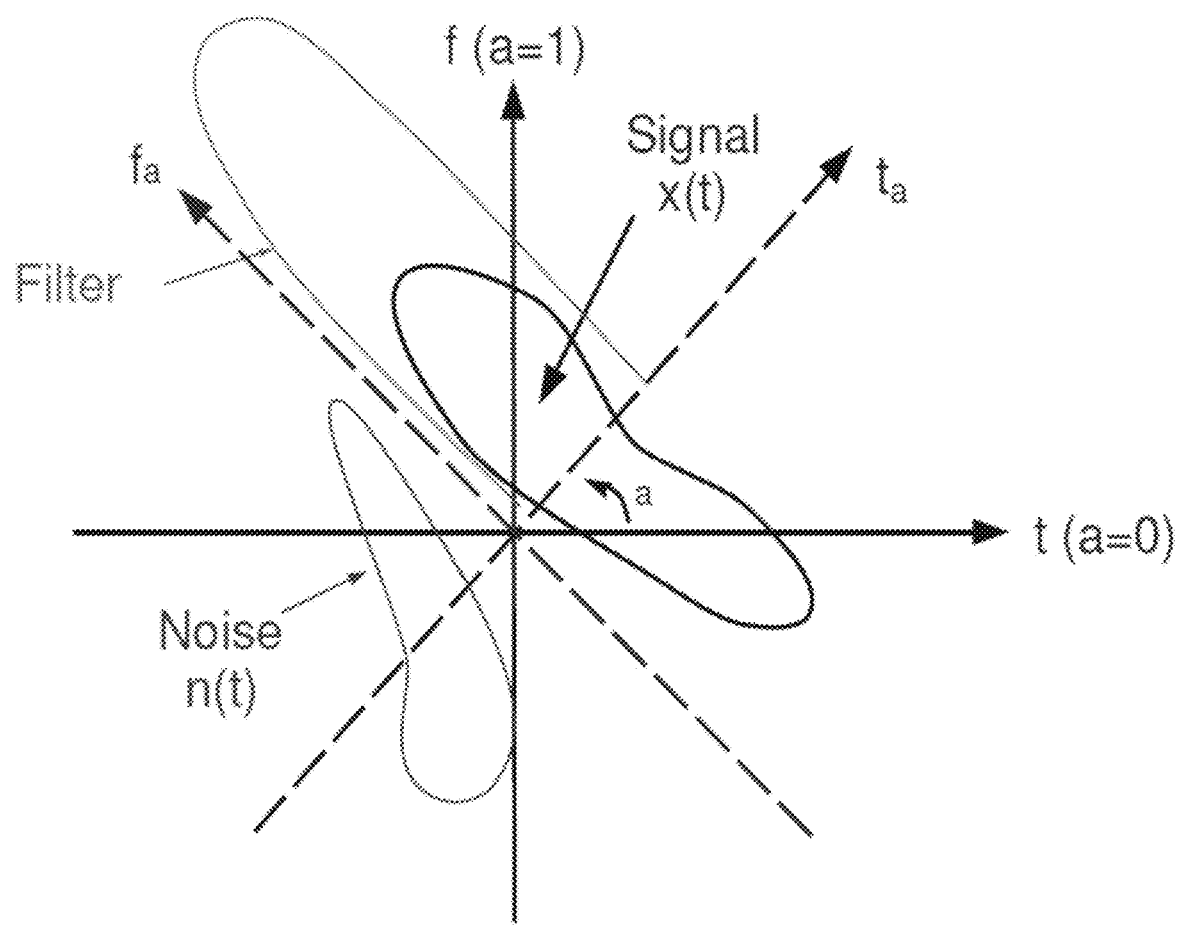
FIG. 1 is time-frequency plane representation of a signal x(t) and noise n(t) as a Wigner Distribution (WD).
Figure 2:
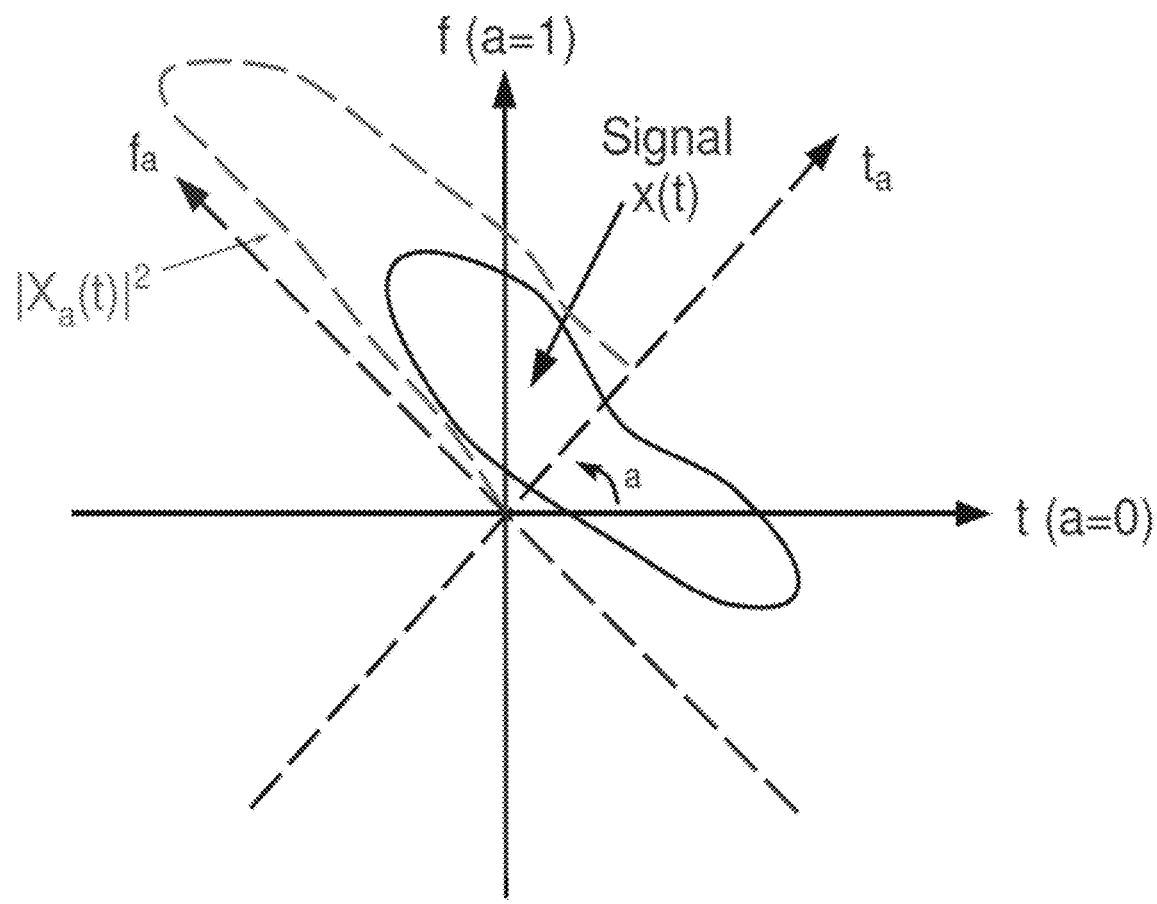
FIG. 2 is a WD representation of a signal x(t), where the energy of x(t) is computed using $|X_a(t)|^2$.
Figure 3:
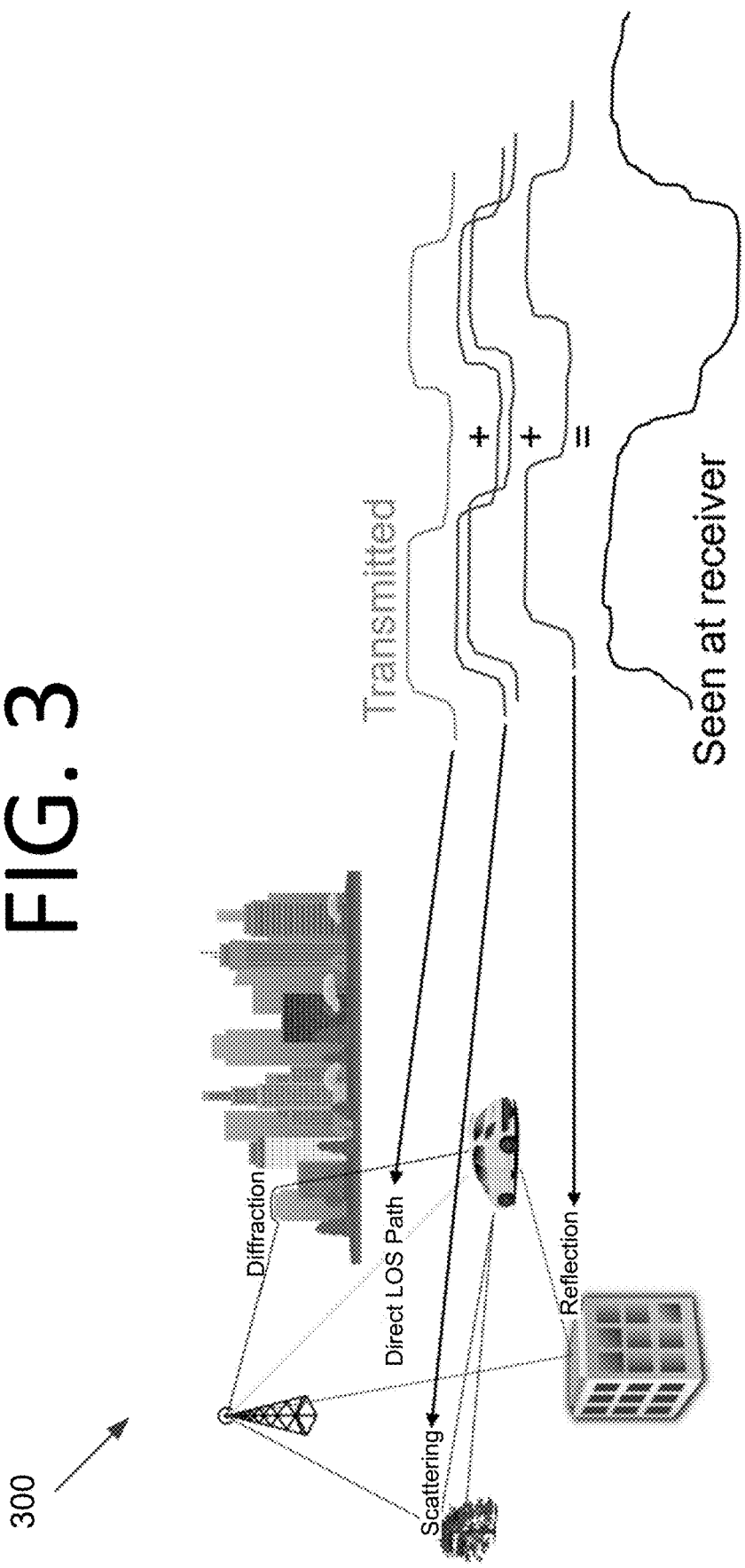
FIG. 3 illustrates the multipath problem for channel estimation.

Some embodiments pertain to channel estimation using a chirp signal (or chirp) and the FrFT. Rather than using a pilot as a training sequence, the channel estimation technique of some embodiments uses a relatively short chirp prior to sending signal data and uses the FrFT to estimate the channel coefficients (e.g., amplitudes and delays) at the receiver. In essence, this replaces the pilot with a single chirp.

In some embodiments, the chirp preamble includes additional information besides the chirp. For example, the preamble could contain other timing or synchronization information to help the receiver acquire the signal and align with the start of a data packet. However, any desired additional information may be included without deviating from the scope of the invention. In certain embodiments, the preamble exclusively includes the chirp signal, which can also be used to provide synchronization.

The chirp as used herein is an analog wave. In some embodiments, 32 samples or less may be used in a well-behaved channel, but up to 1024 samples or more may be used in more unruly channels. How frequently the chirp is sent may depend on the environment and how fast the channel is changing, and therefore, should be estimated. This may be every few milliseconds, for example. In some embodiments, chirp signals could replace pilots in current communication signals and the chirp signal may be sent in place of those pilots. There may thus be no need to send chirp signals more frequently than the frequency of sending conventional pilot signals.

The chirp signal starts with a relatively high frequency and ends at a lower frequency. The chirp signal changes linearly with both time and frequency. There is thus no ambiguity due to the frequency changes. Delays in received signal components tend to be on the order of microseconds for most applications. A rake receiver or another suitable technology, such as an equalizer, can be used by the receiver to correct for the channel. A rake receiver delays, scales, and adds up the signal components. Some embodiments have applications, including, but not limited to, cellular communications, satellite communications, underwater acoustics, radar, sonar, echoes, GPS and its variants (multipath limits GPS accuracy), geolocation (could correct for channel artifacts affecting accuracy), signal transmission in highly cluttered environments, etc. Certain embodiments could improve the quality of voice, data, or any other RF communications.

Such a technique can provide rapid and highly accurate channel estimation, exceeding current capability of the most advanced algorithms and most sophisticated receivers using conventional techniques. Some embodiments can be implemented in software without specialized hardware, although specialized and/or modified hardware may be used in certain embodiments. Some embodiments can estimate even weak channel paths below the noise floor that other techniques cannot find. The performance of some embodiments can achieve the theoretical RMSE lower bound, potentially without additional overhead.

In order to get the chirp signals to "jump up" out of the noise in the FrFT domain, some embodiments rotate to look for peaks (i.e., tones) in the signals to find $a_{opt}$ for the chirp signals. This rotation works for all chirp signal components. Each chirp signal component becomes an amplitude and also gives the values of the multi-channel delay signals, which is given by the differences on the rotated time axis $t_{opt}$. Even weak amplitudes are pulled out of noise in some embodiments. Once channel estimation is performed, all signal components could be added together or the channel could be removed (e.g., using a rake receiver). Proximity of the signal components to one another does not affect this technique. Furthermore, such embodiments even work where no LOS signal is received (e.g., where an object is between the transmitter and the receiver).

Additional receivers may be used to identify what objects are in the environment in some embodiments. The nature of the object(s) may be determined by by the scattering fingerprint. For instance, trees tend to scatter signals due to their many leaves and branches. A map of known objects in the environment may then be generated, and this map may be updated based on changes thereto (e.g., removal of trees, construction of new buildings, etc.).

Precise locations of objects could be determined by collecting signals over time from multiple receivers (e.g., cell towers) and performing triangulation based on these received signals. In certain embodiments, synthetic aperture radar (SAR) could be used to obtain characteristics of objects in the environment. These object characteristics could then be correlated with and matched to satellite imagery. In certain embodiments, when one, some, or many objects in an image no longer correlate, this information may indicate that new imaging should be taken.

Figure 4:
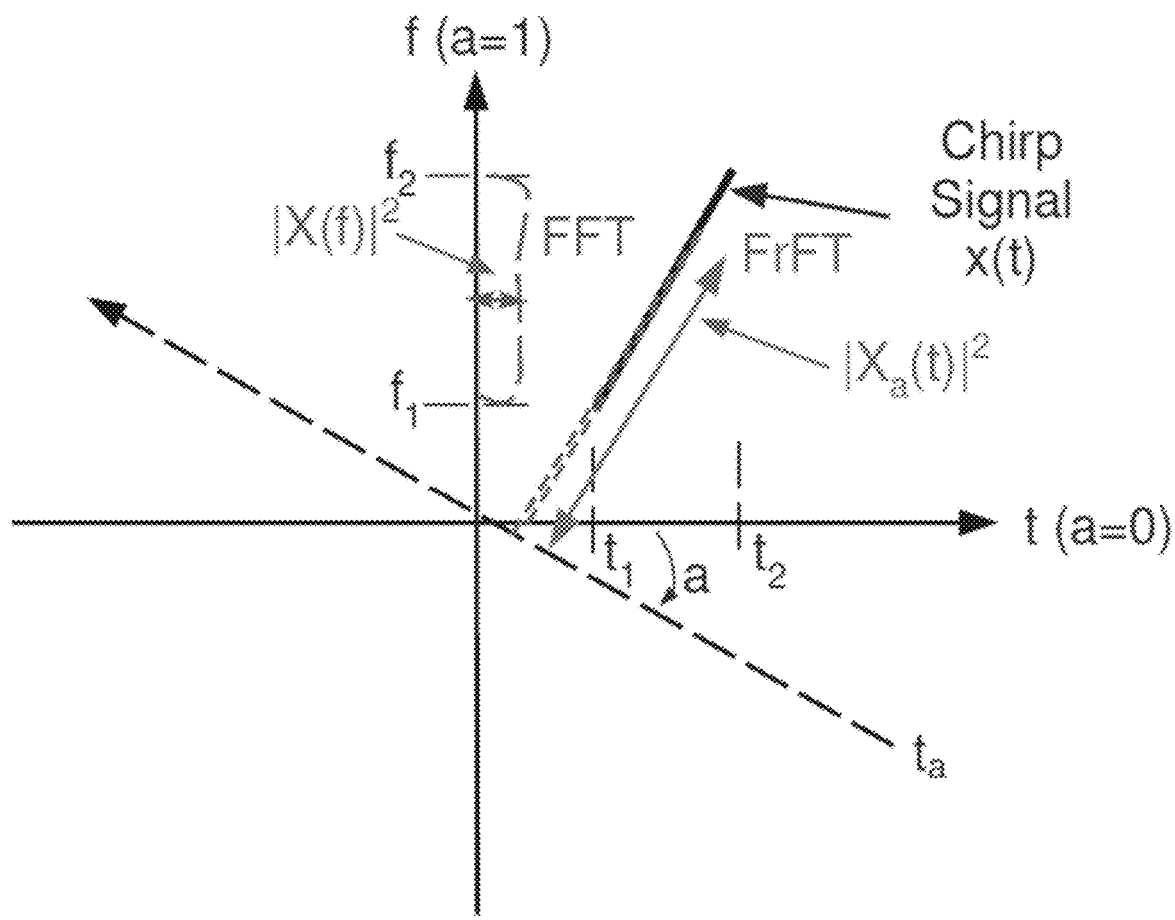
FIG. 4 is a WD representation of a chirp signal x(t), according to an embodiment of the present invention.

Consider the following example. Let x(t) be a chirp signal whose frequency linearly increases over a time interval from $t_1$ to $t_2$ and over the frequency interval from $f_1$ to $f_2$. In the right FrFT domain, the chirp becomes a narrow, high powered tone. See WD representation 400 of FIG. 4, where the lines show the magnitude squared of the FFT and FrFT in gray. The FFT of the chirp is spread out over the frequency, giving it a smaller magnitude (shown by the double arrow line near the label FFT). At the proper rotational value, the FrFT compresses the signal into a tone, resulting in an increased magnitude (shown by the double arrow line near the label FrFT), which pulls it out of noise and interference (not shown).

Signal and Channel Models

A transmitted chirp signal can be modeled as:

$$x(t)=e^{j2\pi f_0 t}e^{j\pi K t^2} \qquad (8)$$

where $f_0$ is the initial frequency of the chirp in hertz (Hz) and K is the rate of change of the frequency in Hz/second. It is assumed here that the transmitted signal is distorted by a multipath channel, which is represented by a vector of coefficients $c=[c_1, c_2, \ldots c_L]$, where L is the number of non-zero channel coefficients, which is typically less than or equal to seven, and additive white Gaussian noise (AWGN). The delay spread of the channel, in units of seconds, is the number of samples between $c_L$ and $c_1$ divided by the sampling rate $f_s$, (samples/second), which is used to capture the signal at the receiver. The AWGN is modeled using a desired signal-to-noise ratio (SNR). The received signal can therefore be rewritten as:

$$y(t)=x(t)*c+n(t) \qquad (9)$$

where * denotes convolution and n(t) is the receiver system noise, modeled as AWGN. The objective is to use the received signal y(t) and estimate the channel coefficient vector c. For a given set of chirp parameters $f_0$ and K, the search for $a_{opt}$ only needs to be performed once in some embodiments. This is described next.

Algorithm

Figure 5:
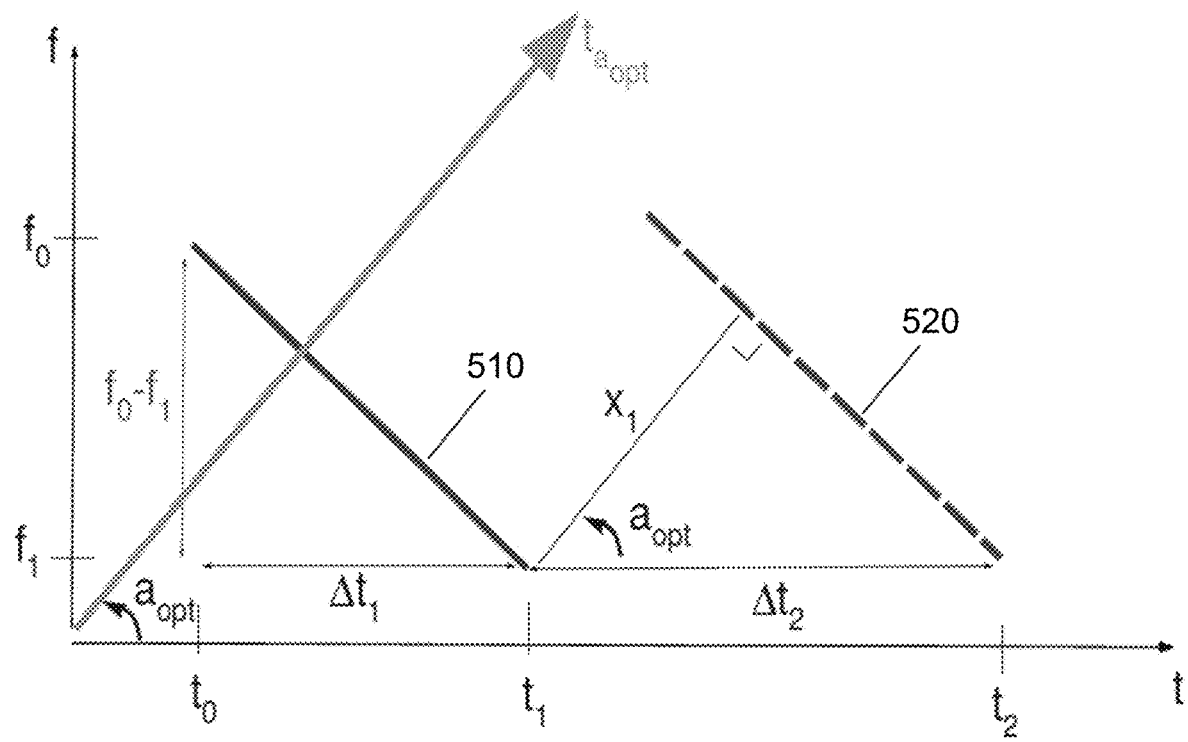
FIG. 5 is a WD of a direct path and single multipath component, according to an embodiment of the present invention.

Consider the WD of a chirp signal traversing a relatively simple two-tap channel, where the first tap is due to the direct path and the second tap is due to a multipath bounce. This WD 500 is shown in FIG. 5, in which the direct path component is a solid line 510 and the multipath component is a dashed line 520. The chirp initial frequency is $f_0$ and its final frequency is $f_1$. The slope, or rate of change of frequency, is K, which is defined as:

$$K = \frac{(f_0 - f_1)}{(t_0 - t_1)} = \frac{\Delta f_1}{\Delta t_1} \qquad (10)$$

where $\Delta f_1 = f_0 - f_1$ and $\Delta t_1 = t_0 - t_1$. The multipath component 520, as shown by the dashed line, has an amplitude that should be estimated, as well as its time delay, which is given by $\Delta t_r$. Note that rotating to the FrFT time axis $t_a$ allows straightforward computation the magnitude of multipath component 520 by finding the peak value in the second tone. This axis may be found through a search over all a, choosing the value for a that gives the strongest amplitude of the FrFT of the signal. For each value of a, a=0: $\Delta$a: 2–$\Delta$a, the FrFT of the received signal y(t) can be computed using:

$$Y_a(t)=F^a y(t) \qquad (11)$$

and the maximum value over the new axis $t_a$ can be determined by:

$$Y_{max,a}=\text{Max}(|Y_a(t)|) \qquad (12)$$

Note that $|Y_a(t)|$ is computed from $y(t)$ using Eq. (7). After performing this operation over the range of all a, the vector $Y_{max,a}$ is obtained and the value of a is computed that gives the strongest peak:

$$a_{opt} = \arg\max/a\ Y_{max,a} \quad (13)$$

and then rotated to $a_{opt}$ with:

$$Y_{peak}(t_{a_{opt}}) = F^{a_{opt}} y(t) \quad (14)$$

which converts the chirps to tones. The channel coefficient amplitude for the strongest (direct) path is found from the peak amplitude, $\max(|Y_{peak}(t_{a_{opt}})|)$. The amplitude in the first multipath component can be found by notching the strongest peak due to the direct path, including a few samples nearby, and then looking for the second strongest peak. This process may be repeated if more multipath components exist. The time delay between the direct path and the multipath component can also be computed by measuring $x_1$ from the rotated spectrum by finding the distance between the peaks (see FIG. 5). The true delay $\Delta t_2$ should be calculated from $x_1$. From FIG. 5, this may be readily computed from the geometry using:

$$\Delta t_2 = \frac{x_1}{\cos(a_{opt})} \quad (15)$$

Defining l=1 as the direct path, the time delay between multipath component l and l−1, l=2, 3, ..., L is given by:

$$\Delta t_l = t_l - t_{l-1} = \frac{x_{l-1}}{\cos(a_{opt})} \quad (16)$$

where $x_{l-1}$ is the measured time delay between multipath components l and l−1 along the optimum FrFT axis $t_a$.

Numerical Examples

Figure 6:
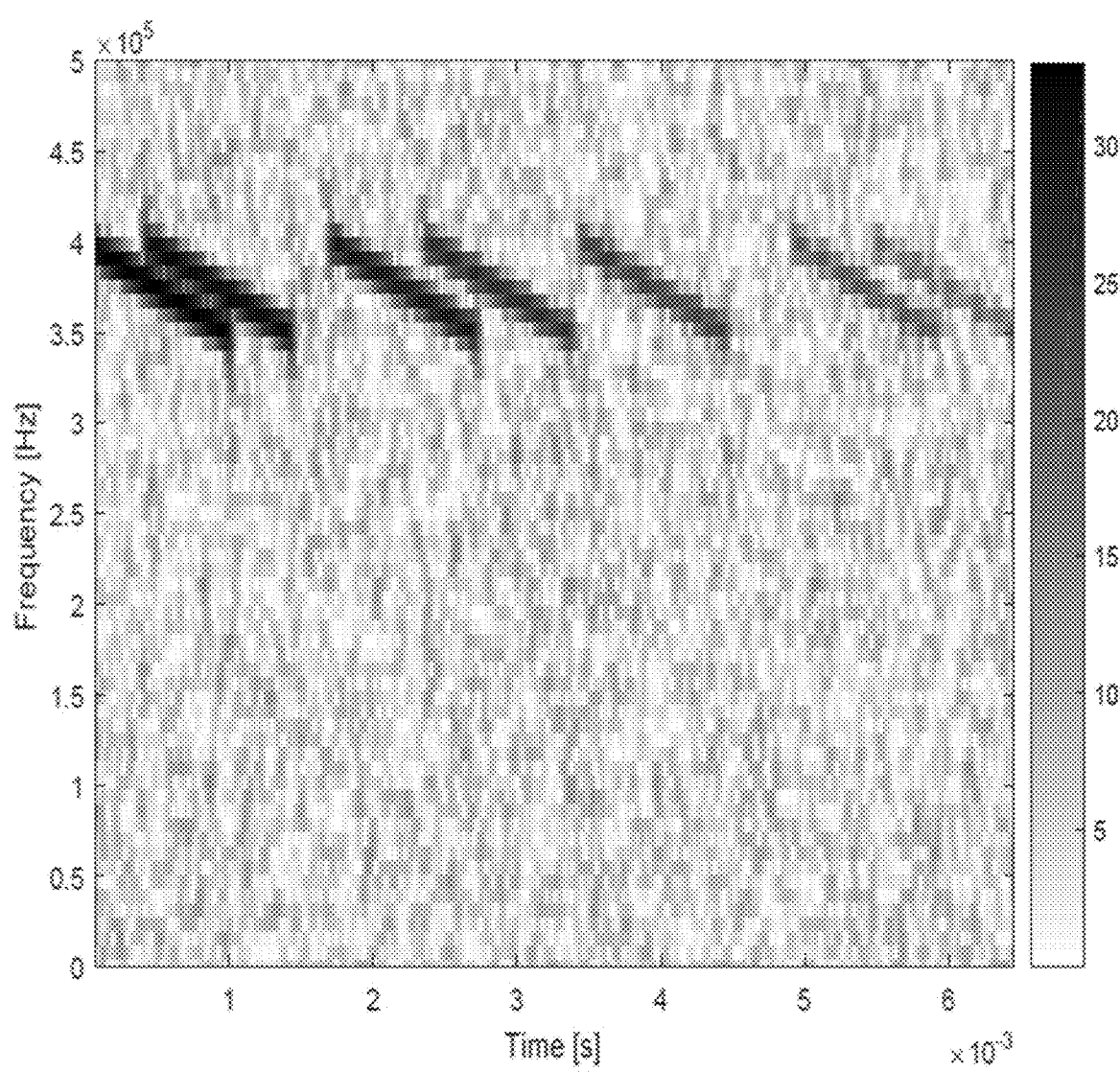
FIG. 6 is a WD of a received chirp signal for an L=7 tap multipath channel, according to an embodiment of the present invention.

The transmitted chirp signal has the form of Eq. (8), where $f_0$=500 kHz and K32-50 MHz/s. A sampling rate of $f_s$=1 MHz was used to generate the time domain signal for N=1,024 samples, and Δa was set to 0.01. FIG. 6 shows a WD 600 of the received signal in the presence of a multipath channel with seven taps at SNR=20 dB. However, this relatively high SNR is used as an example only and this or any suitable SNR may be used without deviating from the scope of the invention. The multipath components can easily be seen. Hence, there is a direct path plus six multipath components. The total delay spread is about 5.5 ms and the separation between the two closest paths is approximately 0.43 ms. Here, the channel coefficient amplitudes are [$c_1\ c_2\ c_3\ c_4\ c_5\ c_6\ c_7$]=[0.64 0.51 0.41 0.30 0.21 0.13 0.09]. The time delays are [$\Delta t_2\ \Delta t_3\ \Delta t_4\ \Delta t_5\ \Delta t_6\ \Delta t_7$]=[0.43 1.29 0.66 1.08 1.47 0.57] ms.

Figure 7:
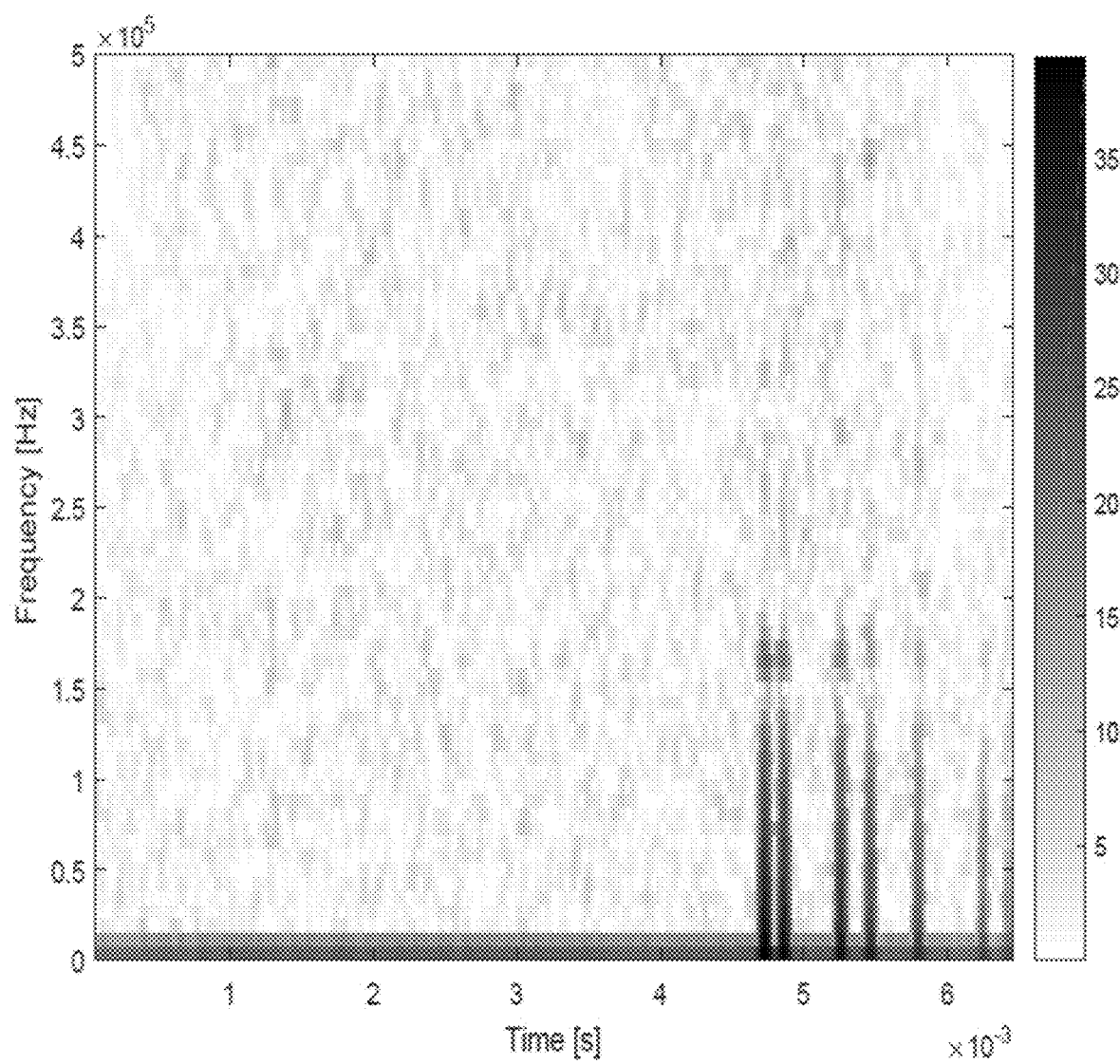
FIG. 7 is a WD of a received chirp signal rotated to $a_{opt}$, $Y_{peak}(t_{a_{opt}})$ for an L=7 tap multipath channel, according to an embodiment of the present invention.

FIG. 7 shows a WD 700 rotated with Eq. (14), using $a_{opt}$=0.8 from Eq. (13). It can be seen from FIG. 7 that the chirps have been rotated to a dimension where they are now tones. Finding the amplitude of each peak gives the channel coefficient amplitudes, and times between peaks gives the values for $x_1$. The time delays are then computed from Eq. (16). Note that $a_{opt}$ only needs to be computed once for a given set of chirp parameters.

Figure 8A:
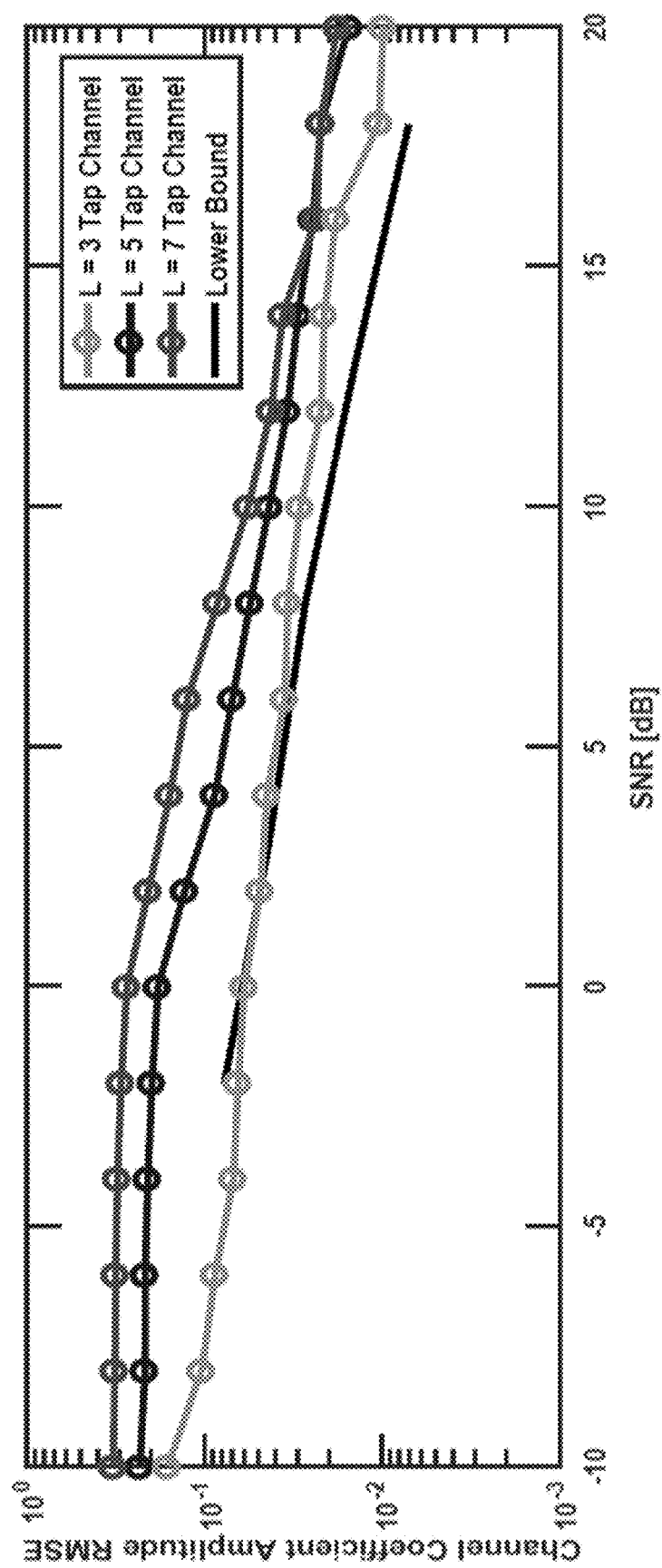
FIG. 8A is a graph illustrating channel coefficient amplitude RMSEs for L=3, 5, and 7 tap channels, according to an embodiment of the present invention.
Figure 8B:
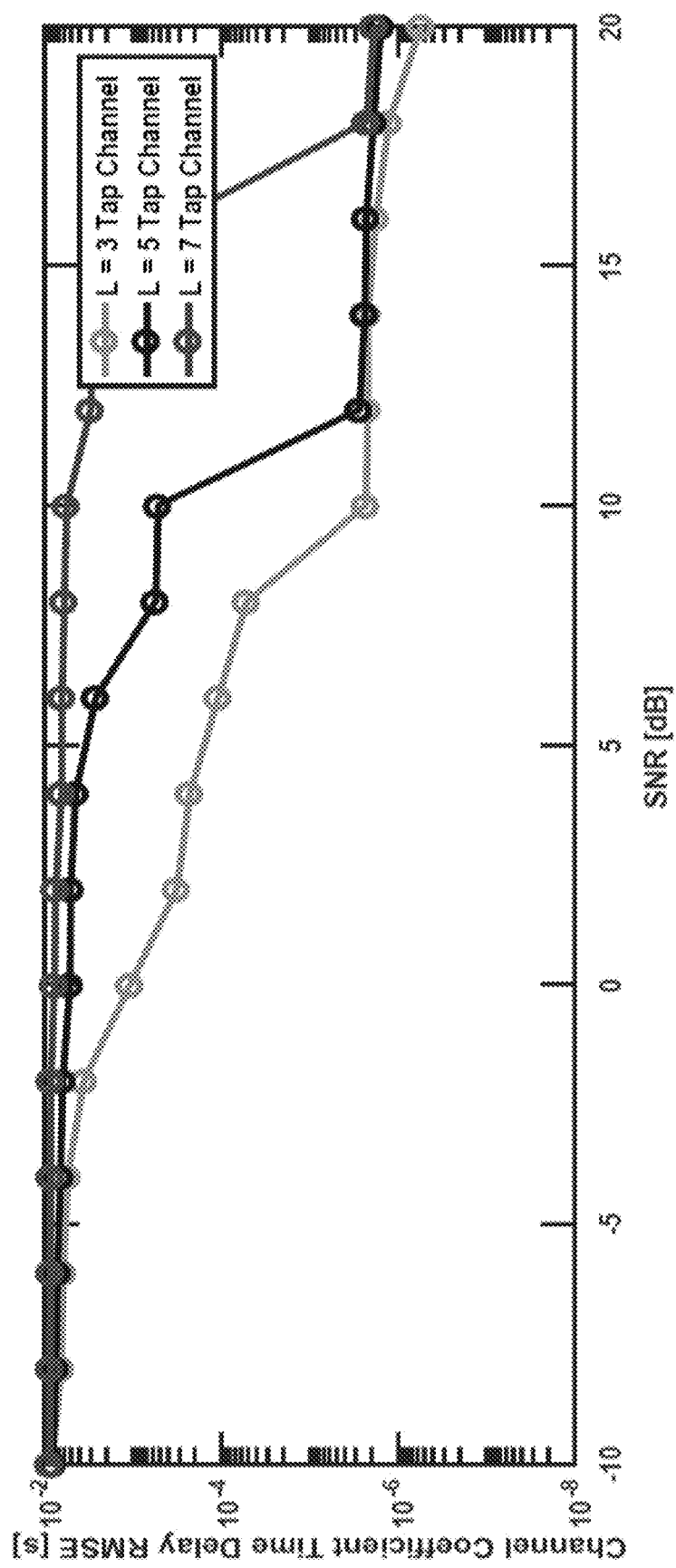
FIG. 8B is a graph illustrating channel coefficient time delay RMSEs for L=3, 5, and 7 tap channels, according to an embodiment of the present invention.

Graphs 800, 810 of FIGS. 8A and 8B show the RMSEs between the true channel coefficients and their estimates (800) and the true channel delays and their estimates (810). These are plotted over a range of SNRs for L=3, 5, and 7 tap channels, where the channel coefficients randomly change every trial and the results were averaged over M=1,000 trials. It can be seen that the RMSE<0.1 when the SNR>5 dB. However, even at an SNR of −10 dB, the RMSE<0.3. The time delays are very accurate (between approximately $10^{-6}$ and $10^{-2}$ seconds) over the range of SNRs from −10 to 20 dB. The channel amplitude RMSE is seen to come very close to the lower bound, which was derived by Golovins et al. See Golovins et al., "Impact of Multipath Channel Parameters on Channel Estimation Performance in OFDM Systems," Proc. IEEE Africa Conference (AFRICON), Nairobi, Kenya (Sep. 23-25, 2009).

The RMSE plateau seen in the delay estimates is due to the noise in the compressed single sample tone not getting notched. It should be pointed out that the algorithm degrades gracefully as N is decreased below 1,024 samples or L is increased beyond 7 taps. With this example, because $a_{opt}$=0.8, using a search step size of Δa=0.1 does not degrade performance. Hence, a careful selection of chirp parameters can allow a smaller search space (i.e., a larger Δa).

Some embodiments thus provide a straightforward and robust algorithm for accurately computing the multipath delay profile in an RF channel. A relatively short chirp may be transmitted, and its received components may be converted to tones using the FrFT, from which the channel tap magnitudes and delays can readily be computed. This may involve measuring peaks in the rotated spectrum, measuring the time between the peaks, and mapping the time in the rotated plane back to the original time. The technique of some embodiments is shown to work accurately with up to L=7 multipath coefficients. Some embodiments work at low SNRs because converting the chirps to tones pulls signals out of the noise. For the same reason, some embodiments require few samples to compute by sending a short chirp at the beginning (e.g., in the header) of a transmission to measure the multipath components.

Some embodiments have various advantages over conventional channel estimation techniques. For instance, some embodiments are highly accurate even in very poor multipath environments. Relatively few samples of a chirp may be required (e.g., 64 samples) to perform well, which hence can reduce pilot overhead. While fewer samples may be used, a hit to RMSE was observed at 32 samples.

Some embodiments are robust in noise since the FrFT rotation pulls weak chirps above the noise floor, allowing for enhanced channel estimates. Some embodiments are also robust in interference. Detection of chirps in interference is still straightforward due to their tone-like structure at the proper rotational value. Some embodiments also provide a more efficient and effective algorithm to calculate channel multipath component amplitudes and delays. Peaks and delays can be readily measured in a rotated signal space. Very short delay paths can also be estimated more easily than conventional schemes such as sub-bit/chip level delays on code division multiple access (CDMA) systems.

Figure 9:
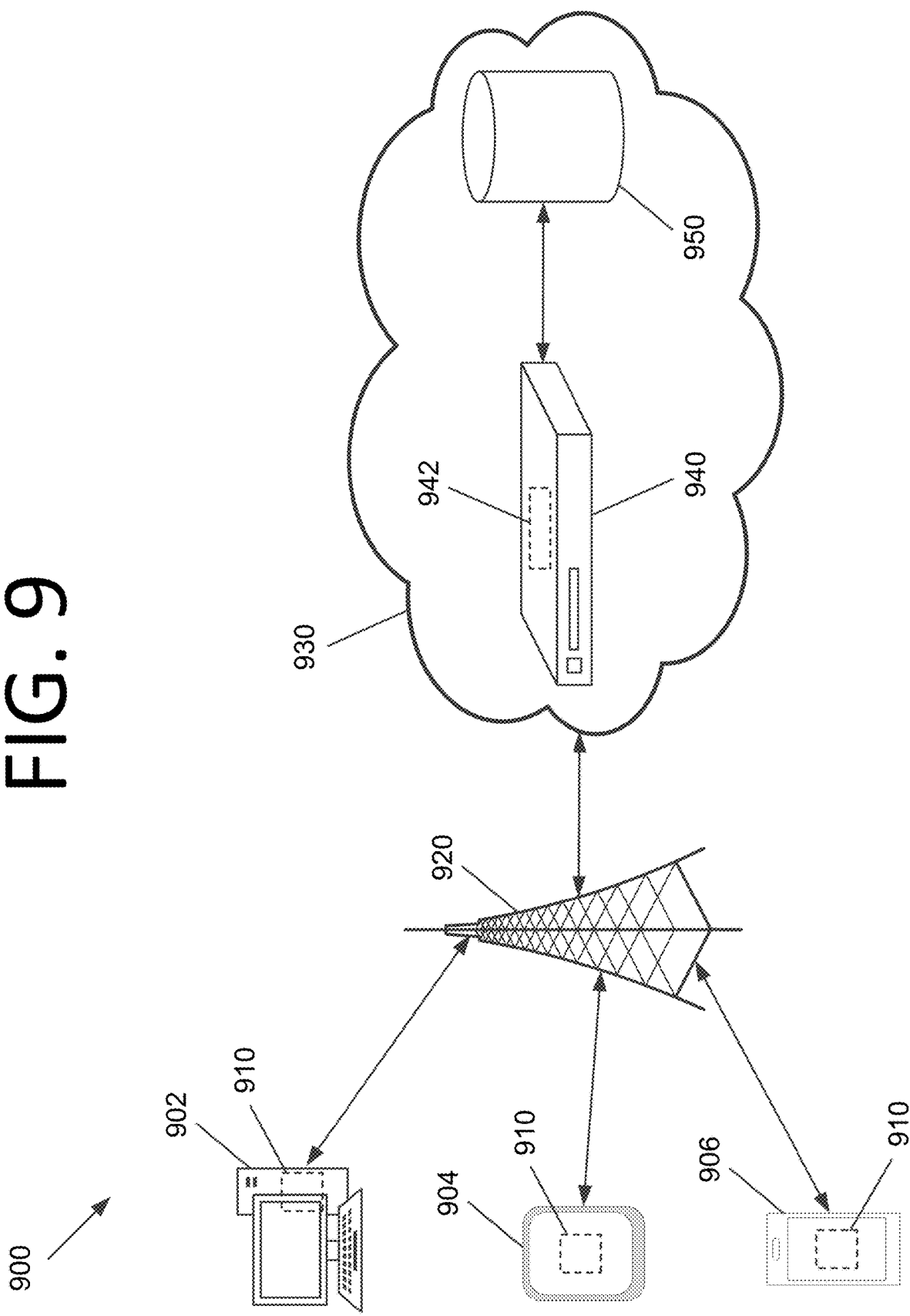
FIG. 9 is an architectural diagram illustrating a system configured to perform channel estimation using a chirp signal and the FrFT, according to an embodiment of the present invention.

FIG. 9 is an architectural diagram illustrating a system 900 configured to perform channel estimation using a chirp signal and the FrFT, according to an embodiment of the present invention. System 900 includes user computing systems, such as desktop computer 902, tablet 904, and smart phone 906. However, any desired computing system may be used without deviating from the scope of invention including, but not limited to, smart watches, laptop computers, Internet-of-Things (IoT) devices, vehicle computing systems, etc.

Computing systems 902, 904, 906 are in communication with a receiver (here, cell tower 920). However, any suitable receiver may be used without deviating from the scope of the invention, such as a radar receiver, a satellite dish, etc. Each computing system 902, 904, 906 has an application 910 running thereon that inserts a chirp sequence prior to sending data in a transmission. In some embodiments, this may be in place of the pilot in conventional channel estimation techniques.

Cell tower 920 receives LOS signal components from computing systems 902, 904, 906 (if a direct path exists), as well as other components due to reflection, diffraction, and/or scattering. As noted above, in some embodiments, channel estimation can still be performed regardless of whether the LOS signal component is received. Cell tower 920 sends the received signal components via a network 930 (e.g., a local area network (LAN), a mobile communications network, the Internet, any combination thereof, etc.) to a server 940 that is running an FrFT-based channel estimation application 942. However, in some embodiments, server 940 is part of or communicably coupled to base station 920. Server 940 stores data (e.g., data pertaining to signal characteristics, object characteristics, satellite imagery data, etc.) in a database 950. Certain embodiments are employed for satellite networks rather than terrestrial networks.

Once channel estimation has been performed, the signal components are matched and digital data is extracted from the signal. Channel estimation may be performed periodically to ensure that data can be obtained when signal components change while computing systems 902, 904, 906 are traveling, for example. It should be noted that channel estimation may be performed by both computing systems 902, 904, 906 and server 940 in some embodiments since multipath affects both sides of the link.

Figure 10:
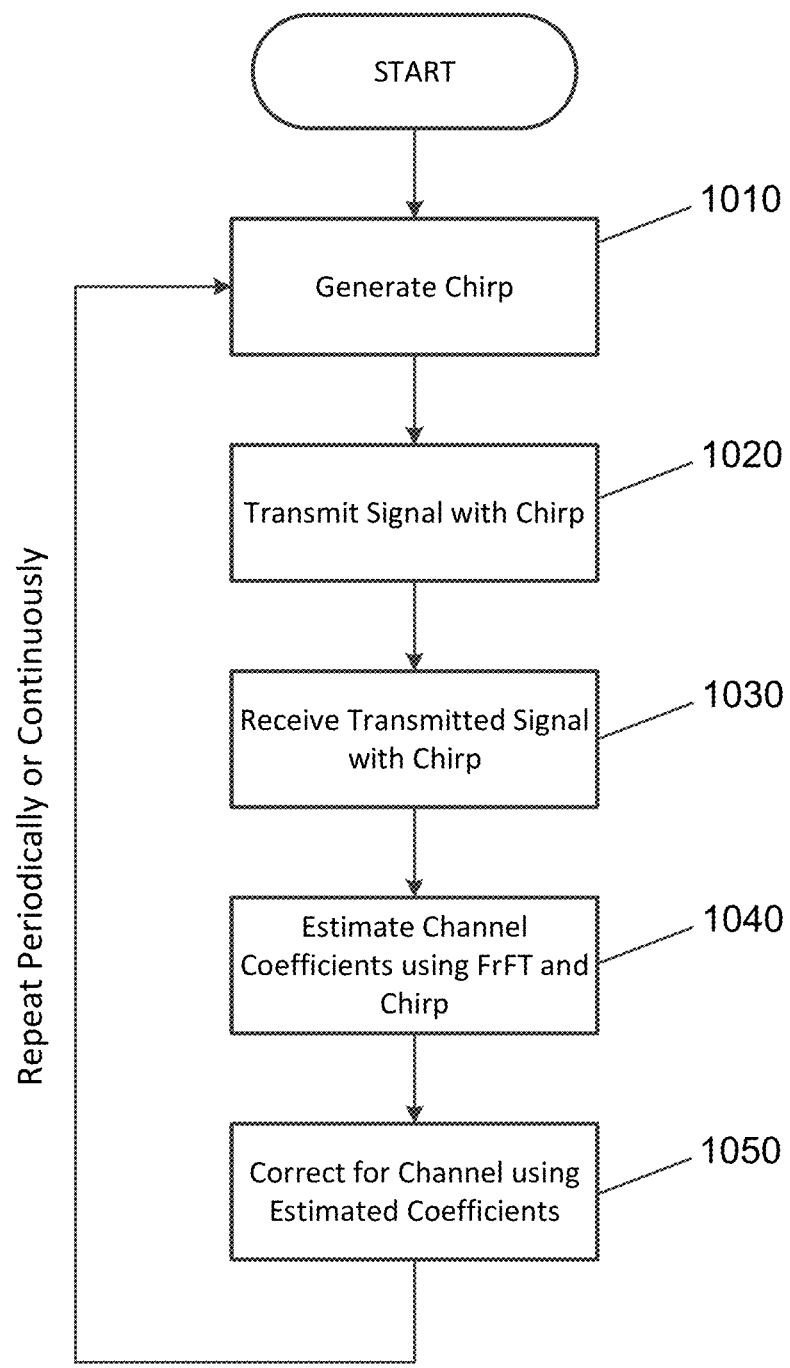
FIG. 10 is a flowchart illustrating a process for performing channel estimation using a chirp signal and the FrFT, according to an embodiment of the present invention.

FIG. 10 is a flowchart illustrating a process 1000 for performing channel estimation using a chirp signal and the FrFT, according to an embodiment of the present invention. The process begins with generating a chirp for a signal (e.g., a communication signal, a radar signal, a sonar signal, etc.) at 1010 and transmitting the signal with the generated chirp at 1020 by a transmitting computing system. In some embodiments, the chirp is included as a preamble of the signal.

While traveling to a receiver the signal spreads out and parts thereof or the entirety thereof are scattered, reflected, and/or diffracted off of objects in the environment. Multiple multipath signal components having different amplitudes and delays are thus received by a receiving computing system at 1030 rather than the signal as it was originally transmitted. In some embodiments, no LOS signal component is received. Coefficients of a channel of the transmitted signal are estimated using an FrFT and the chirp sequence at 1040. In some embodiments, the estimation of the channel coefficients includes calculating an optimal rotational parameter $a_{opt}$ for the chirp sequence such that each chirp sequence component of the multipath signal components becomes a tone and calculating delay values between the chirp sequence components given by differences between the chirp sequence components on a rotated time axis $t_{opt}$. The channel is then corrected using the estimated channel coefficients at 1050. Channel correction may be performed using a rake receiver, an equalizer, etc.

In some embodiments, the correcting for the channel using the estimated channel coefficients includes matching the multipath signal components and adding the matched multipath signal components together (or removing the channel). In certain embodiments, the correction for the channel using the estimated channel coefficients is performed using a rake receiver or an equalizer. The process may be repeated periodically (e.g., every few milliseconds, every second, every ten seconds, continuously, etc.) to ensure that channel estimations are accurate for the current signal environment. In certain embodiments, the receiving computing system uses 32 samples of the chirp sequence or fewer to estimate the channel coefficients.

Figure 11:
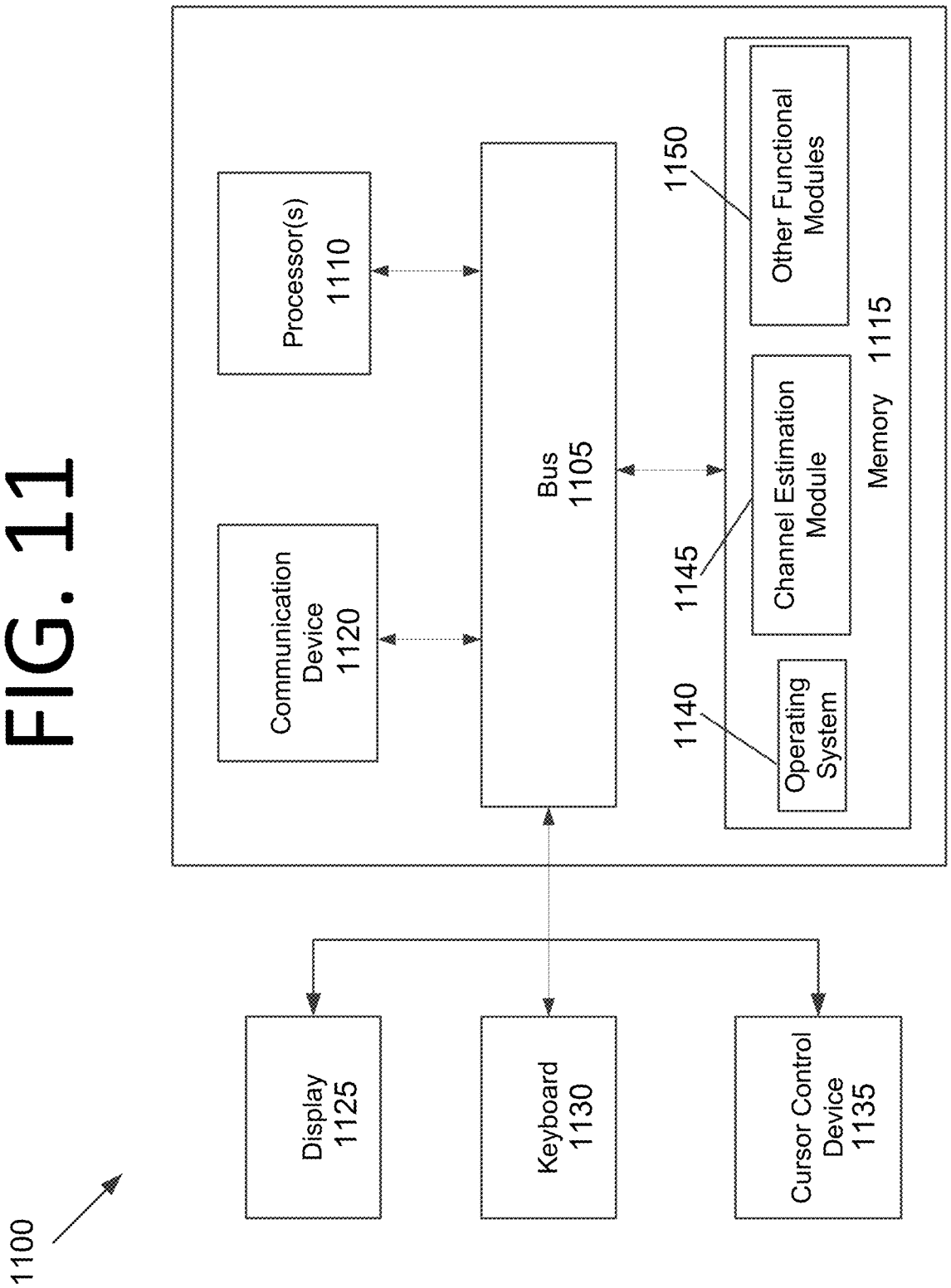
FIG. 11 is an architectural diagram illustrating a computing system configured to perform channel estimation using a chirp signal and the FrFT, according to an embodiment of the present invention.

FIG. 11 is an architectural diagram illustrating a computing system 1100 configured to perform channel estimation using a chirp signal and the FrFT, according to an embodiment of the present invention. Computing system 1100 includes a bus 1105 or other communication mechanism for communicating information, and processor(s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes memory 1115 for storing information and instructions to be executed by processor(s) 1110. Memory 1115 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both.

Additionally, computing system 1100 includes a communication device 1120, such as a transceiver, to provide access to a communications network via a wireless and/or wired connection. In some embodiments, communication device 1120 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1120 may include one or more antennas that are singular, arrayed, phased, switched, beamforming, beamsteering, a combination thereof, and or any other antenna configuration without deviating from the scope of the invention.

Processor(s) 1110 are further coupled via bus 1105 to a display 1125, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1025 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1130 and a cursor control device 1135, such as a computer mouse, a touchpad, etc., are further coupled to bus 1105 to enable a user to interface with computing system 1100. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include a channel estimation module 1145 that is configured to perform all or part of the processes described herein or derivatives thereof. Computing system 1100 may include one or more additional functional modules 1150 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 10 may be performed by a computer program, encoding instructions for the processor(s) to perform at least part of the process(es) described in FIG. 10, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 1110 of computing system 1100 of FIG. 11) to implement all or part of the process steps described in FIG. 10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a transmitting computing system; and
a receiving computing system, wherein
the transmitting computing system is configured to:
generate a chirp for a signal, and
transmit the signal comprising the chirp as a preamble to the receiving computing system, and
the receiving computing system is configured to:
receive a plurality of multipath signal components from the transmitted signal,
estimate coefficients of a channel of the transmitted signal using a Fractional Fourier Transform (FrFT) and the chirp preamble, and
correct for the channel using the estimated coefficients, wherein the estimation of the coefficients of the channel comprises:
calculating an optimal rotational parameter $a_{opt}$ for the chirp such that each chirp component of the multipath signal components becomes a tone, and
calculating delay values between the chirp components given by differences between the chirp components on a rotated time axis $t_{opt}$.

2. The system of claim 1, wherein at least one of the multipath signal components is scattered, reflected, or diffracted off of an object in an environment of the transmitting computing system and the receiving computing system.

3. The system of claim 1, wherein each of the plurality of multipath signal components has a different amplitude and delay from others of the plurality of multipath signal components.

4. The system of claim 1, wherein the chirp preamble comprises additional information besides the chirp.

5. The system of claim 1, wherein the correction for the channel using the estimated coefficients is performed using a rake receiver or an equalizer.

6. The system of claim 1, wherein the correcting for the channel using the estimated coefficients comprises matching the multipath signal components and adding the matched multipath signal components together.

7. The system of claim 1, wherein no line-of-sight (LOS) signal component is included in the plurality of multipath signal components.

8. The system of claim 1, wherein the receiving computing system uses 32 samples of the chirp or fewer to estimate the coefficients of the channel.

9. The system of claim 1, wherein the chirp x(t) is governed by:

$$x(t)=e^{j2\pi f_0 t}e^{j\pi K t^2}$$

where $f_0$ is an initial frequency of the chirp in hertz (Hz) and K is a rate of change of the frequency in Hz per second.

10. The system of claim 9, wherein a received signal including the plurality of multipath components is determined by:

$$y(t)=x(t)*c+n(t)$$

where * denotes convolution, c is a vector of coefficients $c=[c_1, c_2, \ldots, c_L]$ where L is a number of the channel coefficients, and n(t) is noise at the receiver computing system modeled as additive white Gaussian noise (AWGN) using a target signal-to-noise ratio (SNR).

11. A computer-implemented method, comprising:
generating a chirp as a preamble for a signal, by a first computing system;
transmitting the signal comprising the chirp preamble, by the first computing system;
receiving a plurality of multipath signal components resulting from a transmitted signal comprising a chirp preamble, by a second computing system;
estimating coefficients of a channel of the transmitted signal, by the second computing system, using a Fractional Fourier Transform (FrFT) and the chirp preamble, and
correcting for the channel using the estimated vector of coefficients, by the second computing system, wherein
the preamble comprises a single chirp for channel estimation by a receiver of the transmitted signal,
the preamble does not comprise a pilot, and
the estimation of the vector of coefficients of the channel comprises:
calculating an optimal rotational parameter $a_{opt}$ for the chirp such that each chirp component of the multipath signal components becomes a tone, and
calculating delay values between the chirp components given by differences between the chirp components on a rotated time axis $t_{opt}$.

12. The computer-implemented method of claim 11, wherein the signal comprising the chirp preamble is transmitted by the first computing system periodically or continuously.

13. The computer-implemented method of claim 11, wherein the chirp x(t) is governed by:

$$x(t)=e^{j2\pi f_0 t}e^{j\pi K t^2}$$

where $f_0$ is an initial frequency of the chirp in hertz (Hz) and K is a rate of change of the frequency in Hz per second.

14. A computer-implemented method, comprising:
receiving a plurality of multipath signal components resulting from a transmitted signal comprising a chirp preamble, by a computing system;
estimating a vector of coefficients of a channel of the transmitted signal, by the computing system, using a Fractional Fourier Transform (FrFT) and the chirp preamble, and
correcting for the channel using the estimated vector of coefficients, wherein
the estimation of the vector of coefficients of the channel comprises:
calculating an optimal rotational parameter $a_{opt}$ for the chirp such that each chirp component of the multipath signal components becomes a tone, and
calculating delay values between the chirp components given by differences between the chirp components on a rotated time axis $t_{opt}$.

15. The computer-implemented method of claim 14, wherein at least one of the multipath signal components is scattered, reflected, or diffracted off of an object in an environment of the computing system.

16. The computer-implemented method of claim 14, wherein each of the plurality of multipath signal components has a different amplitude and delay from others of the plurality of multipath signal components.

17. The computer-implemented method of claim 14, wherein the correction for the channel using the estimated vector of coefficients is performed using a rake receiver or an equalizer.

18. The computer-implemented method of claim 14, wherein the correcting for the channel using the estimated vector of coefficients comprises matching the multipath signal components and adding the matched multipath signal components together.

19. The computer-implemented method of claim 14, wherein no line-of-sight (LOS) signal component is included in the plurality of multipath signal components.

20. The computer-implemented method of claim 14, wherein the computing system uses 32 samples of the chirp or fewer to estimate the coefficients of the channel.

21. The computer-implemented method of claim 14, wherein the chirp x(t) is governed by:

$$x(t)=e^{j2\pi f_0 t}e^{j\pi K t^2}$$

where $f_0$ is an initial frequency of the chirp in hertz (Hz) and K is a rate of change of the frequency in Hz per second.

22. The computer-implemented method of claim 14, wherein a received signal including the plurality of multipath components is determined by:

$$y(t)=x(t)*c+n(t)$$

where * denotes convolution, c is the vector of coefficients $c=[c_1, c_2, \ldots, c_L]$ where L is a number of the channel coefficients, and n(t) is noise at the receiver computing system modeled as additive white Gaussian noise (AWGN) using a target signal-to-noise ratio (SNR).

* * * * *